United States Patent [19]

Haberl

[11] Patent Number: 4,665,314

[45] Date of Patent: May 12, 1987

[54] METHOD AND CIRCUIT FOR PROCESSING THE SIGNALS OF AN EARTH-HORIZON SENSOR IN AN EARTH SATELLITE

[75] Inventor: Fritz Haberl, Munich, Fed. Rep. of Germany

[73] Assignee: Messerschmitt-Bölkow-Blohm Gesellschaft mit beschränkter Haftung, Munich, Fed. Rep. of Germany

[21] Appl. No.: 745,023

[22] Filed: Jun. 13, 1985

[30] Foreign Application Priority Data

Jun. 14, 1984 [DE] Fed. Rep. of Germany ....... 3422004

[51] Int. Cl.$^4$ .............................................. G01J 1/34
[52] U.S. Cl. ................................. 250/338; 250/342; 250/347; 250/351
[58] Field of Search ............... 250/338, 349, 347, 342, 250/352, 351; 364/434, 459

[56] References Cited

U.S. PATENT DOCUMENTS 3,486,024 12/1969 Astheimer ............................ 250/338
3,551,681 12/1970 Astheimer ............................ 250/349
3,714,432 1/1973 Jalink, Jr. ............................ 250/340
3,920,994 11/1975 Cargille .............................. 250/347

FOREIGN PATENT DOCUMENTS

P3214375.3 10/1983 Fed. Rep. of Germany ...... 250/338
P3322750.0 1/1985 Fed. Rep. of Germany ...... 250/338

OTHER PUBLICATIONS

Van Dijk, P., "The Horizon Sensor", Philips Tech. Rev. 34, No. 8, p. 213.

Primary Examiner—Carolyn E. Fields
Assistant Examiner—Richard Hanig
Attorney, Agent, or Firm—Toren, McGeady and Goldberg

[57] ABSTRACT

A method and a circuit for processing the signals of an earth-horizon sensor of a circularly orbiting earth satellite. The earth-horizon sensor operates in the infrared range and includes, in the focal plane of an input lens, a chopper disk which is periodically reciprocated with a determined chopper frequency (f) and has a diameter corresponding to the image of the earth, as well as a detector (1) receiving the periodically interrupted light radiation of oppositely located earth rims. The output signal of the detector (1) is demodulated synchronously with the chopper frequency (f) in order to derive an off-course signal. In order to suppress the influence of the earth anomaly, the amplified output signal of the detector (1) is additionally synchronously demodulated with the doubled chopper frequency (2f), according to the invention, in order to produce a symmetry signal.

6 Claims, 5 Drawing Figures

METHOD AND CIRCUIT FOR PROCESSING THE SIGNALS OF AN EARTH-HORIZON SENSOR IN AN EARTH SATELLITE

BACKGROUND OF THE INVENTION

1. Field of the Invention

The invention is directed to a method and a circuit for processing the signals of an earth-horizon sensor in a circularly orbiting earth satellite, wherein said earth-horizon sensor operates in the infrared range and includes, in the focal plane of an input lens, a chopper disk which is periodically reciprocated with a determined chopper frequency and which has a diameter corresponding to the image of the earth, and a detector receiving periodically interrupted light radiations of oppositely located earth rims and wherein the output signal of the detector is synchronously demodulated with the chopper frequency in order to derive an off-course signal.

2. Description of Related Art

For the preparation of attitude control signals of such, e.g. geostationary earth satellites, optical earth-horizon sensors, which can be classed with the zero-seeking sensors, are used for two axes. Such an earth-horizon sensor operates in the infrared range and is based on the mechanical vibrator or chopper principle. The infrared radiation of the earth is collected by means of an objective lens of germanium and falls on a circular chopper disk in the focal plane of the lens. This chopper disk has a diameter corresponding approximately to the image of the earth and is periodically reciprocated with a determined chopper amplitude and a determined chopper frequency. The light of the two oppositely located earth rims which are alternately released with the chopper frequency, the light being periodically interrupted by the chopper disk, is guided, via a spectral filter for the infrared range, onto a detector, e.g. a pyroelectric detector, via a secondary lens consisting of a spherical mirror segment and a prism. The oscillation of the chopper disk is sine-shaped; the chopper amplitude is stabilized by means of an electronic drive unit.

When the optical line of sight of the earth-horizon sensor is directed to the earth central point, the oppositely located earth rims are periodically pictured on the detector which produces, after amplification, an electric signal similar to that of a rectified sine wave. If the radiation portions of the oppositely located earth rims are identical, then the amplified signal is transformed in a synchronous demodulator, into a sine oscillation without a direct current component, wherein the synchronous demodulator is keyed with the chopper frequency so as to be rigidly in phase. The zero signal obtained in this way determines the zero point of the off-course signal used for the attitude control of the earth satellite.

If the line of sight of the earth-horizon sensor is not directed to the earth central point, then unequal radiation portions from the opposite earth rims impinge on the detector. The detector again supplies a signal in the form of a rectified sine-wave voltage, but the amplitudes of the half-waves are different. The synchronous demodulator, which is again keyed with the chopper frequency so as to be rigidly in phase, then generates a direct current voltage which depends, approximately linearly, on the deviation of the line of sight of the earth-horizon sensor from the satellite/earth central point connecting line. This off-course signal can then be used for the attitude control.

Up to this point it has been assumed that the two oppositely located earth rims have the same temperature; as a rule, however, this is not the case. Particularly in the north-south direction of the earth, the oppositely located earth rims have different temperatures, which is commonly designated as earth anomaly, by means of which the demodulated off-course signal has a direct current component also when the optical line of sight of the earth-horizon sensor is actually directed toward the earth central point. The demodulated off-course signal, accordingly, still contains an anomaly portion caused by the earth anomaly, which anomaly portion can be described by means of a zero point displacement of the characteristic line of the earth-horizon sensor in the ordinate direction, wherein the sensor characteristic line is displaced in the direction of the side with the weaker radiation, i.e. the radiation assigned to a lower temperature. Therefore, care must be taken that this anomaly portion is corrected. This anomaly error within the linear measuring area of the earth-horizon sensor of approximately ±1° is only slight, but can amount, in extreme cases, to approximately ±16% of the linear measuring range. Since geostationary earth satellites are also used for producing directional radio links and guided television links to the earth, the anomaly portion must be suppressed as much as possible.

SUMMARY OF THE INVENTION

The invention has the object of providing a method and apparatus for the attitude control of a geostationary earth satellite with an earth-horizon sensor of the aforementioned type, with which method and apparatus, signals can be prepared which enable a definite attitude control of the earth satellite.

This object is met, according to the invention, by additionally synchronously demodulating the amplified output signal with double the chopper frequency to produce a symmetry signal. This symmetry or presence signal shows a dependence on the cosine square of the off-course angle. The maximum of this symmetry signal is at off-course angle zero, i.e. when the optical line of sight of the earth-horizon sensor is directed to the earth central point. It is important that this symmetry signal be independent from the earth anomaly.

This symmetry signal can be used, for example, to control the chopper amplitude. The energy which is radiated from the earth and is received for the area of the earth rims by means of the earth-horizon sensor, according to the Stefan-Boltzmann law, is porportional to the fourth power of the absolute temperature and proportional to the magnitude of the radiating surface. If the optical line of sight of the earth-horizon sensor is directed to the earth central point, then the magnitude of these radiating surfaces at the oppositely located earth rims, which magnitude is detected by the earth-horizon sensor during the oscillation of the chopper disk, is proportional to the surface released by the chopper disk in the focal plane of the earth-horizon sensor and is, accordingly, also proportional to the respective chopper amplitude. If the two oppositely located earth rims have slightly different temperatures, if i.e. an earth anomaly is therefore present, then the energy difference produced by this which is detected by the earth-horizon sensor for the oppositely located earth rims, is directly proportional to the chopper amplitude. This error produced by means of the earth anomaly can therefore be kept small in an exact alignment of the earth-horizon sensor by means of adjusting a small chopper amplitude. For large deviations of the earth-horizon sensor from the exact alignment, the visual range of the earth-horizon sensor, i.e. the chopper amplitude, must be increased correspondingly in order to avoid a premature saturation of the off-course characteristic line of the earth-horizon sensor. In order to keep the error caused by the earth anomaly as small as possible, the chopper amplitude is therefore controlled according to a characteristic line corresonding to the reflected symmetry signal, wherein a minimum chopper amplitude is pregiven for the accurate alignment of the earth-horizon sensor, which minimum chopper amplitude increases toward both sides in dependence on the deviation, corresponding to the curve of the reflected symmetry signal. The selected minimum amplitude in the zero point, i.e. when the earth-horizon sensor is aligned with the earth central point, must be great enough that the off-course signal developed by the earth-horizon sensor comprises the still positive and negative portions, i.e. it still intersects the horizontal characteristic line axis corresponding to the off-course values. By means of such a control, the chopper amplitude with the reflected symmetry signal, which latter is shifted by a minimum amplitude, has the effect that the off-course signal/deviation characteristic line in the zero point area, which characteristic line is otherwise obtained during an earth anomaly and is displaced relative to the standard characteristic line without earth anomaly, is changed in such a way that smaller off-course errors result. Moreover, this control is also independent from the anomaly error, since the symmetry signal itself is independent from the earth anomaly. The control of the chopper amplitude and the rest of the evaluation of the signals supplied by the earth-horizon sensor can be effected either internally in the circuit in the earth-horizon sensor, or externally in a position computer.

It is important, particularly in an external processing of the signals of the earth-horizon sensor for attitude control of the earth satellite, to have available a digital presence signal which indicates whether the earth is or is not present in the pick-up range of the earth-horizon sensor. As long as the demodulated off-course signal is not equal to zero, i.e. there is actually an incorrect position of the satellite or a deviation of the optical line of sight of the earth-horizon sensor from the satellite/earth central point connecting line, this digital presence signal can be obtained by means of a simple rectifying of the off-course signal, i.e. by means of evaluating the amount of the off-course signal. However, if the deviation is small, i.e. the off-course signal moves in the zero point range of the off-course characteristic line, then only the analog symmetry signal can be used for the formation of the digital presence signal, since—as explained above—the latter shows a peak in the zero point range of the off-course signal. The off-course signal, according to magnitude, and the analog symmetry signal are combined with one another for this purpose in a simple digital OR-connection.

Accordingly, the demodulated off-course signal, the analog symmetry signal and the digital presence signal, which can be used for the attitude control internally in the circuit or external to the circuit in a position computer, appear at the output of the circuit.

BRIEF DESCRIPTION OF THE DRAWINGS

The invention is explained in more detail in the embodiment examples with the aid of the drawing. Shown in the drawing are.

DESCRIPTION OF THE PREFERRED EMBODIMENT

Figure 4:
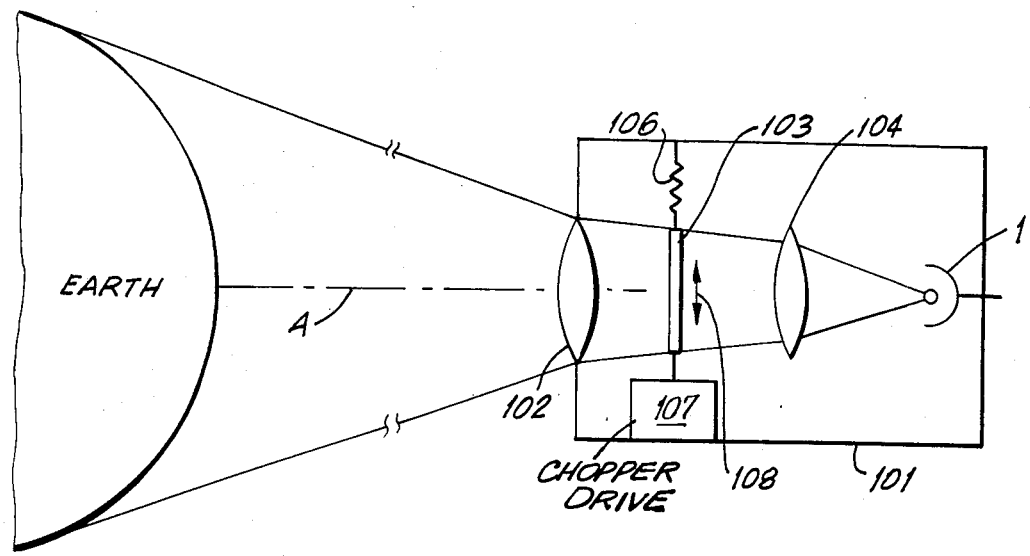
FIG. 4 a functional block diagram of an earth-horizon sensor.

In FIG. 4, a functional block diagram of the optical system of earth-horizon sensor is shown.

This optical system includes a housing 101 with input optics 102, a chopper disk 103, intermediate optics 104 and a photodetector 1. In case of a correct attitude of the earth satellite, the optical axis A is oriented towards the center of the earth. Radiation emanating from the earth and its surroundings is received by the input optics 102 and concentrated onto the photodetector 1 by the intermediate optics 104. The opaque chopper disk 103 is arranged in the path of the beams between the input optics 102 and the intermediate optics 104 in such a way that the image of the earth is exactly covered, in view of this no radiation falls on the photodetector 1. The chopper disk 103 is connected with the housing 101 by a spring 106 and is periodically reciprocated in its plane by a chopper drive 107, as is indicated by the double arrow 108. The chopper disk 103 in its entirety is a spring-mass system oscillating at its natural frequency, so that only a small amount of energy is required for the periodic drive.

If the chopper disk 103 moves towards the top when viewed in the sketch, then radiation from the bottom rim of the earth now falls through the optics 102 and 104 onto the photodetector 1, so that it generates a signal. The amplitude of the chopper disk 103 is very small and lies within a range of about one-tenth of the diameter of the chopper disk 103. After reversing the motion, the chopper disk 103 moves toward the bottom through a neutral position shown at which the output current of the photodetector 1 is equal to zero. Subsequently, the radiation from the top earth rim falls through the optics 102, 104 onto the photodetector 1, so that it again puts out a signal. The course of this signal is, as easily seen, a sine curve. This sine curve signal is synchronously demodulated after being amplified. Herein the portions lying above and beneath the zero line of the sine curve signal are evaluated against one another. If the satellite is in the correct attitude as illustrated in the sketch, so that optical axis A is oriented towards the center of the earth, then the positive and negative portions of the sine curve signal are equal, so that after the synchronously demodulation, a zero signal appears at the output of the off-course demodulator. However, if the satellite is not correctly aligned, then the sine curve signal is not symmetrical to the line, wherein the radiation of one of the two earth rims is larger than the radiation emanating, respectively, from the other earth rim. Because of the evaluation of the portions of the sine curve signal lying above and beneath the zero line, there appears at the synchronous demodulation, a positive or negative signal at the output of the photodetector 1 depending on the erroneous alignment of the optical axis A in the direction of one of the earth rims. The usual error deviations measured with this sensor lie within the range of ±1°.

Figure 1:
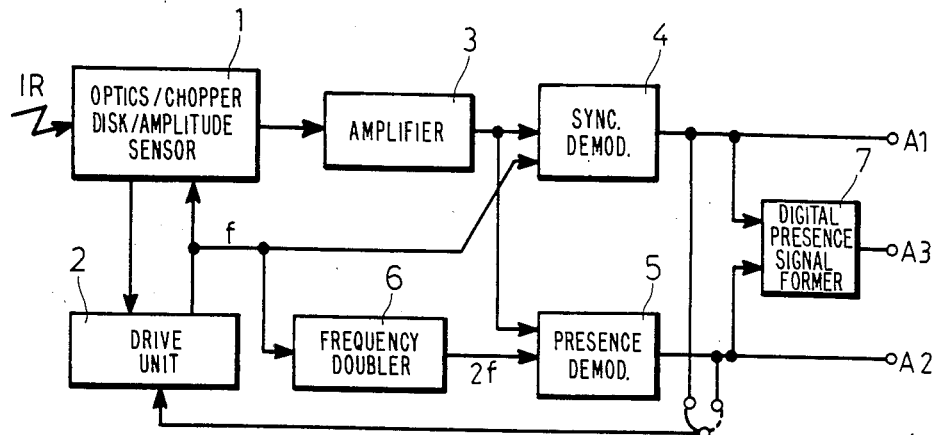
FIG. 1 a schematic block diagram of an earth-horizon sensor with a circuit, according to the invention, for processing the output signals of the earth-horizon sensor.
Figure 5:
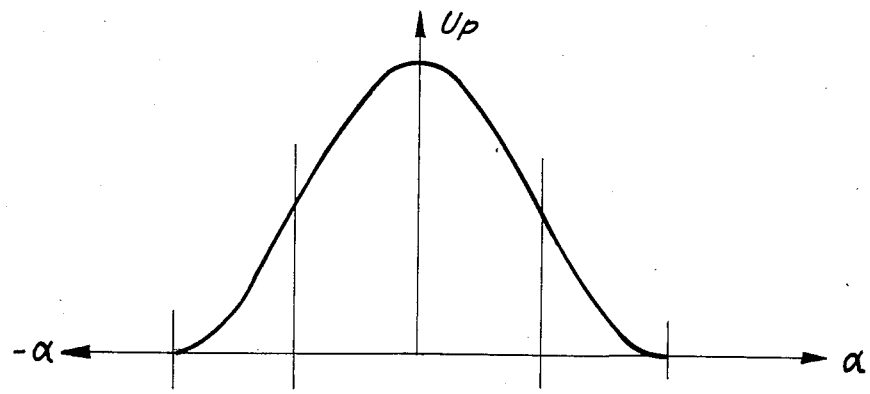
FIG. 5 a plot of the presence or symmetry signal as a function of off-course angle.

In FIG. 1, the detector of the earth-horizon sensor, including the lens and the chopper disk operated with the chopper frequency f, are shown schematically as block 1. The drive of the chopper disk is controlled via the electronic drive unit 2 with respect to frequency as well as amplitude, for which purpose an amplitude sensor, whose signals are fed to the electronic drive unit, is provided in addition, in block 1 for the chopper disk. The output signals of the detector 1 are amplified in an amplifier 3 and subsequently fed to a synchronous demodulator 4 comprising an integrated low-pass filter, wherein the synchronous demodulator is keyed with the chopper frequency f. At the output of the synchronous demodulator, an off-course signal appears and is applied to output A1. The amplified output signal of the detector is fed to a presence demodulator 5 with built-in low-pass filter, in addition to being fed to the synchronous demodulator 4, wherein this presence demodulator 5 is keyed synchronously with the double chopper frequency 2f produced from the chopper frequency in a frequency doubler 6. The amplified output signal of the detector, which is synchronously demodulated and guided through the low-pass filter in this way, is a bell-shaped signal which as shown in FIG. 5, is plotted over the off-course angle and which peaks at the ZERO value of the off-course angle. The signal declines symmetrically on both sides from the peak, specifically in the form of the square value of the cosine of the off-course angle. This symmetrical or analog presence signal is made available at a second circuit output A2. As explained above, this symmetry signal is independent from the earth anomaly.

As indicated in FIG. 1, the symmetry signal can be guided back to the control input of the electronic drive unit and is used for controlling the chopper amplitude. It has been shown that in order to reduce the anomaly portion, the chopper amplitude must be optimally adapted to the respective deviation if an increase in the accuracy of the earth-horizon sensor is desired. By means of the control and stabilization of the chopper amplitude by means of the symmetry signal, the anomaly error is reduced in the zero point of the off-course characteristic line of the earth-horizon sensor, as stated above.

The off-course signal and the symmetry signal can also be combined via a digital OR-connection to form a digital presence signal, which is located at a circuit output A3, and indicates whether the earth is located in the pick-up range of the earth-horizon sensor. The circuit needed for the connection is designated by block 7 in FIG. 1.

Figure 2:
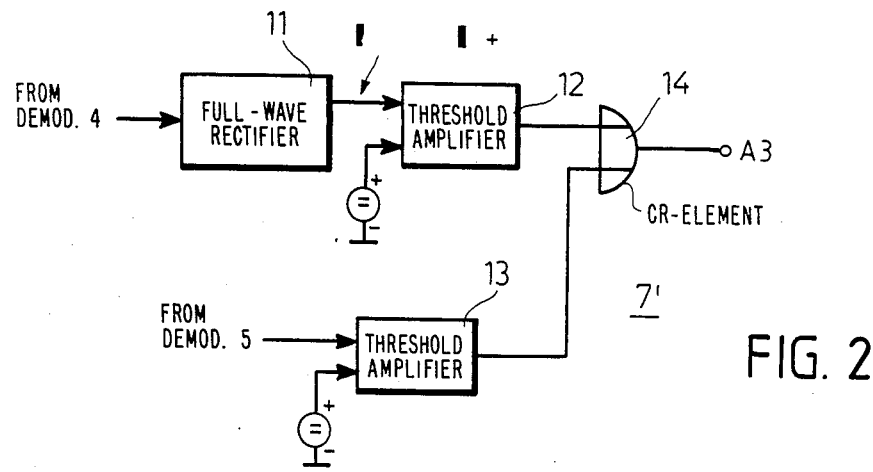
FIG. 2 a first circuit example for the formation of a digital presence signal.
Figure 3:
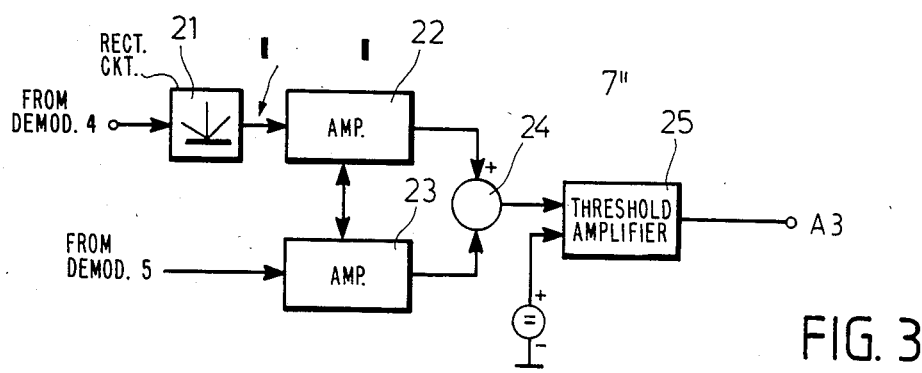
FIG. 3 a second circuit example for the formation of a digital presence signal.

FIGS. 2 and 3 show two circuit constructions 7' and 7", respectively, for the connection of the two signals.

According to FIG. 2, the off-course signal is fed to a full-wave rectifier 11 so that a unipolar signal appears at its output corresponding to the magnitude of the deviation. The unipolar output signal and the symmetry signal are each fed separately to amplifiers threshold amplifier 12 and 13, respectively, e.g. Schmitt triggers with corresponding threshold voltages. The output signals of the Schmitt triggers 12 and 13 are combined in a digital OR-element 14 at whose output the digital presence signal then occurs.

In the combinatorial circuit 7" according to FIG. 3, a uniplar signal corresponding to the magnitude of the off-course signal is again produced from the off-course signal in a rectifier circuit 21. This unipolar signal and the symmetry signal are synchronized with one another separately in amplifiers 22 and 23, respectively, with respect to their maximum values and are then subsequently analogically added in a summing element 24. The output signal of the analogically amplifying summing element 24 is fed to a threshold amplifier 25, e.g. a Schmitt trigger with determined threshold voltage. The output signal of this Schmitt trigger 25 is then the digital presence signal. The matching of the amplitudes of the two connected signals in the amplifiers 22 and 23 is effected such that the summing signal at the output of the analog summing element 24 always exceeds the threshold of the Schmitt trigger 25 as long as the earth is present in the pick-up range of the earth-horizon sensor.

The signals at the circuit outputs A1 to A3 can be further processed externally in a position computer (not shown) for forming an attitude control signal, as was indicated above. It is also possible to use the off-course signal subjected to the anomaly portion caused by the earth anomaly for eliminating the anomaly portion internally in the circuit by means of the analog symmetry signal located at the output A2. The off-course signal at output A1 is further demodulated at the chopper frequency and, after being linearized, is applied to a correction circuit for correcting the off-course signal at A1. This corrected off-course signal may then be combined with the presence signal forming a control signal which may be used to adjust the amplification in amplifier 3 until the control signal is reduced to zero.

This circuit arrangement corrects the off-course signal based on the following principles.

If there is no earth anomaly, the characteristic line of the earth-horizon sensor can be approximately shown by means of the following formula $$U_{D\alpha} = \frac{2}{\pi} \cdot K \cdot A \cdot \text{sine}\left(\alpha \cdot \frac{K_A}{A} \cdot 90\right) \tag{1}$$

The formula is applicable for the range $$-1 \leq \alpha \cdot \frac{H_A}{A} \leq -1$$

In the formula:
$U_{D\alpha}$ = the sensor off-course signal which is dependent on the off-course angle $\alpha$ and is measured as electrical current;
$K$ = a constant proportionality factor which is determined by means of the sensor geometry;
$A$ = chopper amplitude;
$\alpha$ = off-course angle of the line of sight of the earth-horizon sensor;
$K_A$ = a mechanical, likewise constant transmission factor.

The entire characteristic line extends over an angle area of approximately ±18°; the measuring range used for the sensor off-course angle is approximately ±1°. It can be seen that the characteristic line can be linearized for small off-course angles, specifically by means of the following formula:

$$U_{D\alpha}^x = K \cdot K_A \cdot \alpha \qquad (2)$$

If the two earth rims radiate different energies then the entire characteristic line $U_D$ is composed of the above uninterrupted characteristic line $U_{D\alpha}$ and an anomaly portion $U_{DA}$:

$$U_D = U_{DA} + U_{D\alpha} \qquad (3)$$

The anomaly portion $U_{DA}$ is then:

$$U_{DA} = H \cdot A \cdot \frac{1-V}{1+V} \qquad (4)$$

On the basis of the above formulas 1, 3 and 4, then, there follows for the characteristics line $U_D$ of the earth-horizon sensor:

$$U_D = K \cdot A \cdot \frac{1-V}{1+V} + \frac{2}{\pi} \cdot K \cdot A \cdot \text{sine}\left(\alpha \frac{K_A}{A} \cdot 90\right) \qquad (5)$$

$$\text{for } -1 \leq \alpha \frac{K_A}{A} \leq +1$$

or for small values $\alpha$ $$U_D^x = K \cdot A \cdot \frac{1-V}{1+V} + K \cdot K_A \cdot \alpha \qquad (6)$$

It follows from formulas 4 to 6 that, as indicated above, the anomaly portion of the sensor off-course signal depends only on the anomaly V and the chopper amplitude A.

If the sensor off-course signal is now measured at two different chopper amplitudes A and A1, the anomaly portion $U_{DA}$ will be independent of the anomaly V at least for small angles. For small angles $$U_{DA} = \frac{A}{A - A_1} (U_D - U_{D1}) \qquad (7)$$

applies for the anomaly portion and $$U_{D\alpha}^x = U_D - \frac{A}{A - A_1} (U_D - U_{D1}) \qquad (8)$$

applies for the characteristic line $U_{D\alpha}^x$ which is simplified, corrected and true for small off-course angles $\alpha$ For the earth anomaly V there follows:

$$V = \frac{(A - A_1) \cdot K - (U_D - U_{D1})}{(A - A_1) \cdot K + (U_D - U_{D1})} \qquad (9)$$

from which it follows that the earth anomaly depends only on the chopper amplitude and the sensor off-course signals at the different chopper amplitudes. Of course, for large off-course angles, the complete formula for the characteristic lines must be made use of.

What is claimed is:

1. A method for processing the signals of an earth-horizon sensor in a circularly orbiting earth satellite, wherein said earth-horizon sensor operates in the infrared range and includes, in the focal plane of an input lens, a choppr disk periodically reciprocated with a determined chopper frequency and having a diameter corresponding to the image of the earth, and a detector receiving the periodically interrupted light radiation of oppositely located earth rims, wherein said method comprises synchronously demodulating and output signal of said detector with said chopper frequency in order to derive an off-course signal, characterized in that said method further comprises additionally synchronously demodulating said amplified output signal of said detector with the doubled chopper frequency in order to produce a symmetry signal and, controlling the amplitude of said periodically reciprocated chopper disk with said symmetry signal, wherein any anomaly error due to uneven temperatures of the oppositely located earth rims is substantially reduced.

2. A method according to claim 1, characterized in that said symmetry signal and said off-course signal, according to magnitude, are combined in a digital OR-connection indicating whether the earth is located in the pick-up range of said earth-horizon sensor in order to form a digital presence signal.

3. A circuit for processing the signals of an earth-horizon sensor in a circularly orbiting earth satellite, wherein said earth-horizon sensor operates in the infrared range and includes, in the focal plane of an input lens, a chopper disk having a diameter corresponding to the image of the earth, means for periodically reciprocating said chopper with a determined chopper frequency, a detector receiving periodically interrupted light radiations of oppositely located earth rims, and an amplifier for amplifying an output of said detector, said circuit comprising an off-course demodulator coupled to said amplifier, for demodulating the amplified output signal of said detector with said chopper frequency in order to derive an off-course signal, characterized in that said circuit further comprises a presence demodulator also coupled to said amplifier which is synchronized with a doubled chopper frequency (2f) so as to be rigidly in phase for forming a presence signal, said presence signal being applied to a control input of said chopper disk reciprocating means for controlling the amplitude of reciprocation of said chopper disk in dependence thereon.

4. A circuit according to claim 3, characterized in that the output of said off-course demodulator is additionally connected with a magnitude circuit supplying the magnitude of said off-course signal, and the output of said magnitude circuit and said output of said presence demodulator are combined with one another via a digital OR-connection for preparing a digital presence signal indicating whether the earth is located in the pick-up range of said earth-horizon sensor.

5. A circuit according to claim 4, characterized in that said output of said off-course demodulator is connected with a full-wave rectifier whose output and said output of said presence demodulator are each connected with a threshold amplifier, and the outputs of said threshold amplifiers are connected with an OR-element, whose output forms said digital presence signal.

6. A circuit according to claim 4, characterized in that said output of said off-course demodulator is connected with a series connection comprising a full-wave rectifier and an amplifier, in that said presence demodulator is connected with an additional amplifier, and in that the outputs of said two amplifiers are guided to an analog summing element whose output is connected with a threshold amplifier, and in that the output of said threshold amplifier forms said digital presence signal.

* * * * *